United States Patent
Kontothanassis et al.

(10) Patent No.: US 8,205,003 B2
(45) Date of Patent: Jun. 19, 2012

(54) METHODS AND SYSTEMS FOR CONTROLLING THE ADMISSION OF MEDIA CONTENT INTO A NETWORK

(75) Inventors: Leonidas Kontothanassis, Arlington, MA (US); Wai-tian Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1798 days.

(21) Appl. No.: 10/982,136

(22) Filed: Nov. 5, 2004

(65) Prior Publication Data

US 2006/0168307 A1 Jul. 27, 2006

(51) Int. Cl.
*G06F 15/16* (2006.01)
(52) U.S. Cl. .................. 709/231; 709/232
(58) Field of Classification Search .......... 709/231, 709/232
See application file for complete search history.

(56) References Cited

U.S. PATENT DOCUMENTS

| | | | |
|---|---|---|---|
| 5,926,624 A * | 7/1999 | Katz et al. .......... 709/217 |
| 2002/0002599 A1 | 1/2002 | Arner et al. |
| 2003/0061356 A1 | 3/2003 | Jason |
| 2003/0172163 A1 | 9/2003 | Fujita et al. |
| 2005/0188073 A1 | 8/2005 | Nakamichi et al. |

FOREIGN PATENT DOCUMENTS

| CN | 1495684 A | 5/2004 |
|---|---|---|
| WO | WO 2004/072369 | 8/2004 |

* cited by examiner

*Primary Examiner* — Adnan Mirza (57) ABSTRACT

Methods and systems for controlling the admission of media content into a network are disclosed. A method includes accessing a request for authorization to transfer media content where the request for authorization includes details of a request for media content made to a server of a plurality of servers. In addition, the method includes determining whether at least one of the plurality of servers will be authorized to accommodate the request for media content. A message is generated that is accessible by the server. An admission of media content by the server is coordinated with admissions of media content by the plurality of servers.

27 Claims, 8 Drawing Sheets

METHODS AND SYSTEMS FOR CONTROLLING THE ADMISSION OF MEDIA CONTENT INTO A NETWORK

TECHNICAL FIELD

Embodiments of the present invention pertain to methods and systems for controlling the admission of media content into a network.

BACKGROUND ART

Video streaming is increasingly becoming an important communication tool in corporate environments. Senior management addresses, personnel training, and sales material often involve the use of video streaming from a corporate headquarters facility to local offices. Problems can arise where streaming traffic and non-streaming traffic make use of the same network infrastructure. A conventional video streaming network is shown in FIG. 1.

Figure 1:
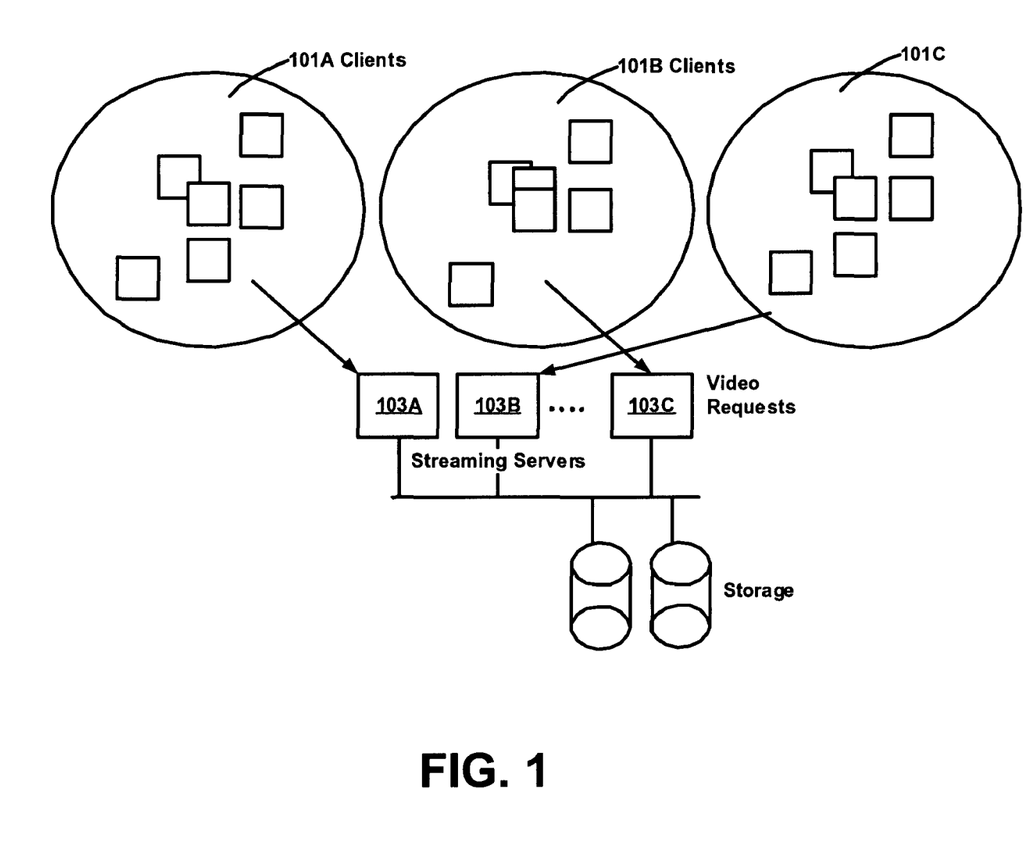
FIG. 1 shows a conventional video streaming network.

In FIG. 1, a collection of sites 101A-101C containing clients, directs video streaming requests (see FIG. 1) from the clients to streaming servers, 103A-103C, that are typically located elsewhere (e.g., at corporate headquarters). The servers accept the requests and serve (e.g., supply, transmit, communicate etc.) the streams that correspond to the requests. In the mode illustrated in FIG. 1, video streaming makes use of the same infrastructure that carries other corporate traffic including e-mail, web access, file transfer protocol (ftp), and database access. There exist, however, fundamental differences between the type of traffic flows induced by streaming and those other services.

Conventional corporate services are implemented using transmission control protocol (TCP) which places a premium on lossless transmission and in responsible sharing of network resources. TCP flows will detect packet loss, retransmit all lost packets, and more importantly reduce their transmission rates until loss is no longer present. These congestion control properties of TCP make it possible for all these services to harmoniously share network links in an optimal fashion both at high and low demand periods. Streaming on the other hand requires that packets be sent to their destination at a fixed rate, and can only recover lost packets within a limited time window. The unfortunate side-effect of these aspects of streaming is that video streaming can crowd out all other communication, thus crippling other corporate services (e.g., e-mail). Furthermore, since it is difficult to reduce streaming rates, accepting a large number of requests can end up having a detrimental effect on the streams themselves with each client having an unacceptable experience.

Most streaming servers allow administrators to set an admission threshold. This makes it possible to deny streaming requests that would result in utilization that would exceed a preset limit. However this capability is of little use in an environment like the one illustrated in FIG. 1. First and foremost a server may be responsible for serving multiple network links, and there is no way to set a different threshold on a per link basis. Second, a practical threshold may depend on what other traffic is present on the link at the moment, and there is no way for the streaming server to determine this. Third, multiple servers may be collaborating in servicing requests over a particular network link and there is no easy way for those servers to make collaborative decisions. Finally, the link's capacity may vary over time, e.g., virtual private network (VPN) connections, and thus any fixed threshold could be inappropriate.

Figure 2:
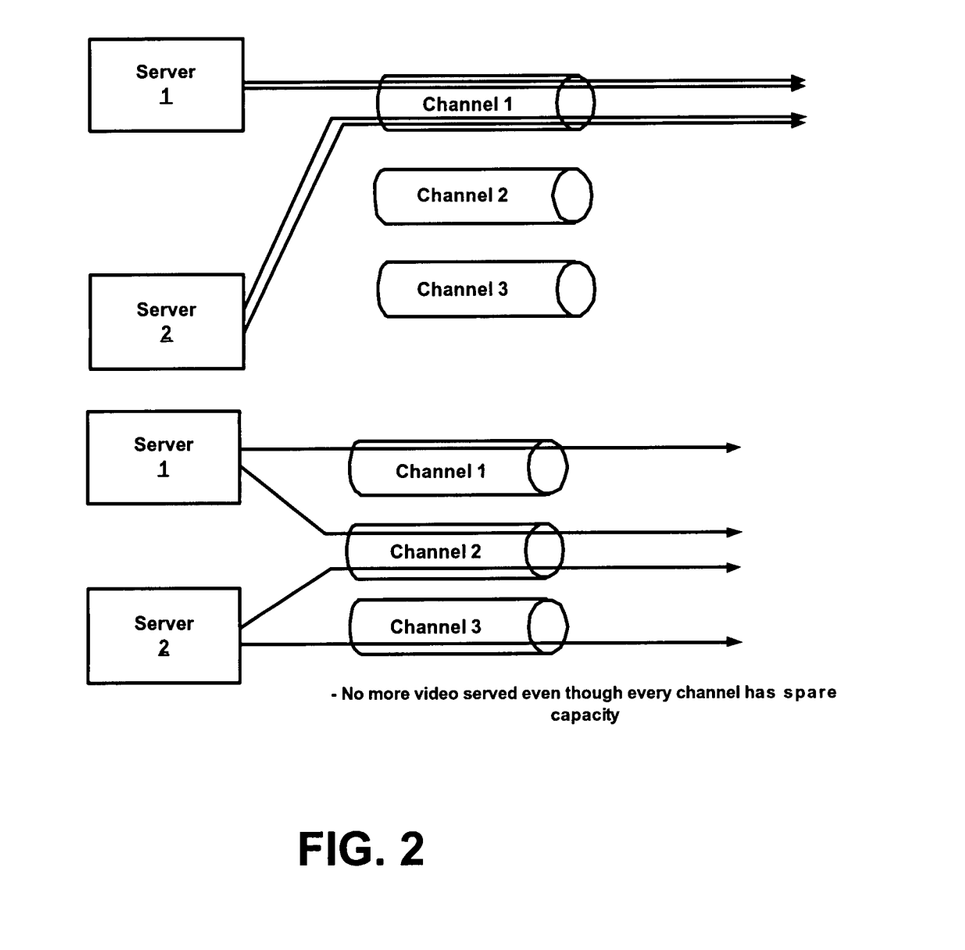
FIG. 2 illustrates the problems that can arise from conventional admission control techniques.

FIG. 2 illustrates the problems that arise with locally controlled streaming content admissions that are not coordinated. In the FIG. 2 example each server (server 1 and server 2 in FIG. 2) has a serving threshold of two streams and each channel (channel 1, channel 2 and channel 3) can support three streams. FIG. 2 illustrates how a lack of coordination among servers can lead to both over-use (top illustration) and under-use (bottom illustration) of the network channels. For example, in the top illustration, channel 1 is overwhelmed even though both server 1 and server 2 believe that channel 1 is being used within its bandwidth. In the bottom illustration, additional content is not served over channels 1 and 3 even though those channels have spare capacity.

Conventional approaches either accept all traffic flows and attempt to prioritize them inside the network (allowing the network administrator to set target utilizations and target priorities) or to manage the admission of traffic flows on a per server basis (as illustrated in FIG. 2). Network centered approaches can ensure that TCP flows are accommodated but requires global network infrastructure upgrades that are both costly and difficult to manage. Moreover, server centered approaches often fail to allocate usage properly in the presence of multiple network links and multiple streaming servers.

DISCLOSURE OF THE INVENTION

Methods and systems for controlling the admission of media content into a network are disclosed. A method includes accessing a request for authorization to transfer media content, where the request for authorization includes details of a request for media content made to a server of a plurality of servers. In addition, the method includes determining whether at least one of the plurality of servers will be authorized to accommodate the request for media content. A message is generated that is accessible by at least one of the plurality of servers. An admission of media content by the server is coordinated with admissions of media content by the plurality of servers.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

For purposes of the following discussion "admission control" is intended to refer to the action of the herein described admission control authority to police (e.g., grant or deny permission) to a server to admit (e.g., serve, transmit, stream, etc.) media content over a network.

Figure 3A:
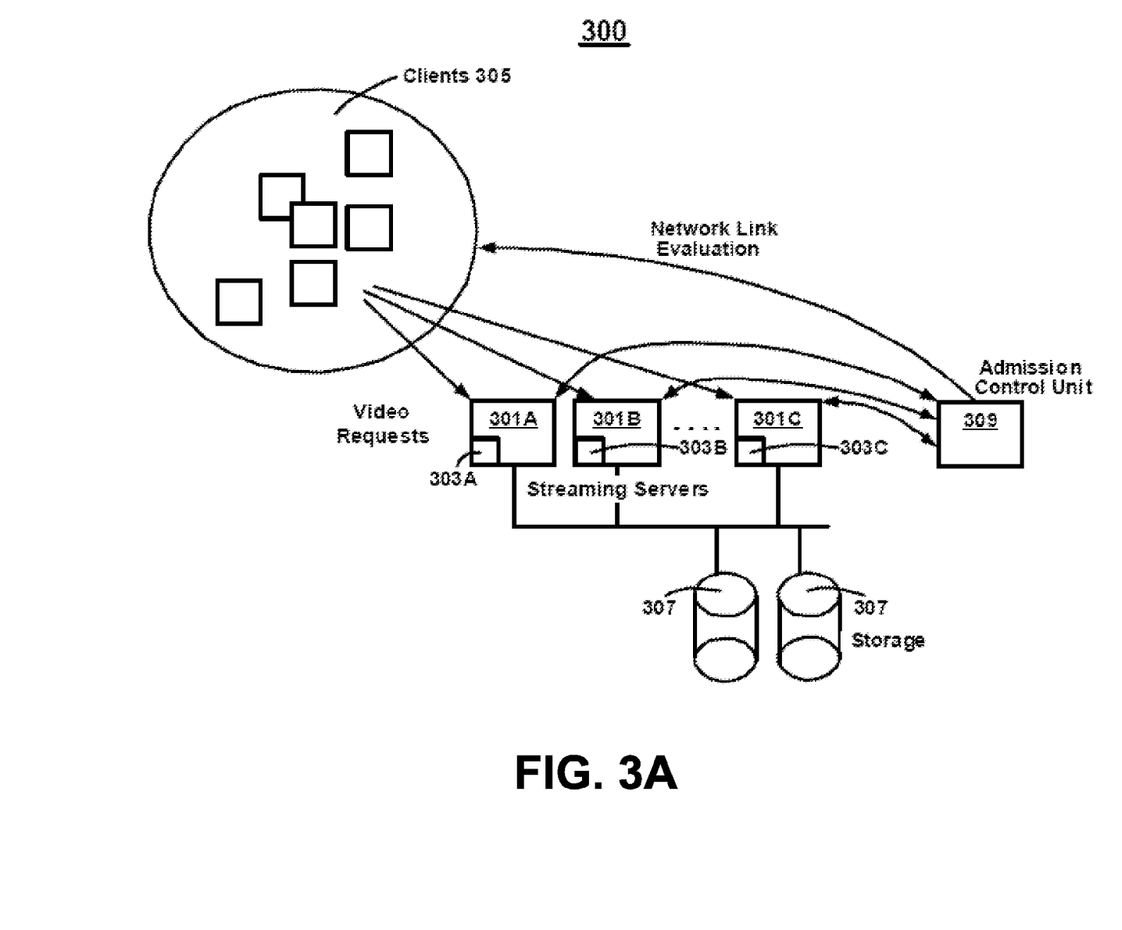
FIG. 3A shows an exemplary admission control network architecture according to one embodiment of the present invention.

Exemplary Media Content Admission Control Network Architecture According to One Embodiment of the Present Invention FIG. 3A shows an exemplary media content admission control network architecture 300 according to one embodiment of the present invention. The media content admission control network architecture 300 includes an admission control authority that coordinates a pool of servers' admissions of media content into a network. In exemplary embodiments, media content admission decisions related to the servers are decoupled from the servers' media content serving functionalities. Moreover, the admission control authority coordinates the pool of servers' admissions of media content based on the aggregate requests for media content that are received by the servers (as opposed to having each server perform its own individual local media content admission control based on the requests that the individual server receives). In the FIG. 3A embodiment, media content admission control network architecture 300 includes a pool of servers 301A-301C, admission control plug-ins 303A-303C, clients 305, storage units 307 and admission control authority 309.

Servers 301A-301C maintain media content that can be accessed by clients 305. In one embodiment, the media content that is maintained by the servers 301A-301C can include, but is not limited to, streaming media content. In one embodiment, clients 305 can initiate their access to the media content (e.g., streaming, etc.) by transmitting a request for desired media content (e.g., streaming, etc.) to the server (e.g., 301A, 301B or 301C) that maintains the desired media content. In the present embodiment, an admission control authority 309 determines whether a request for media content will be granted.

In one embodiment, each server (301A, 301B and 301C) is augmented with an admission control plug-in (e.g., 303A-303C). In an alternate embodiment, the admission control plug-in (e.g., 303A-303C), components thereof, or its equivalent can reside at a location that is remote from the server with which it is associated. In yet another embodiment, the components and operations of the admission control plug-in (e.g., 303-303C) can be encompassed by components and operations of the server with which it is associated. The admission control plug-ins 303A-303C are responsible for communicating media content admission authorization requests to the admission control authority 309 and subsequently communicating the decisions of the admission control authority 309 back to the server (e.g., 301A, 301B or 301C).

Figure 3B:
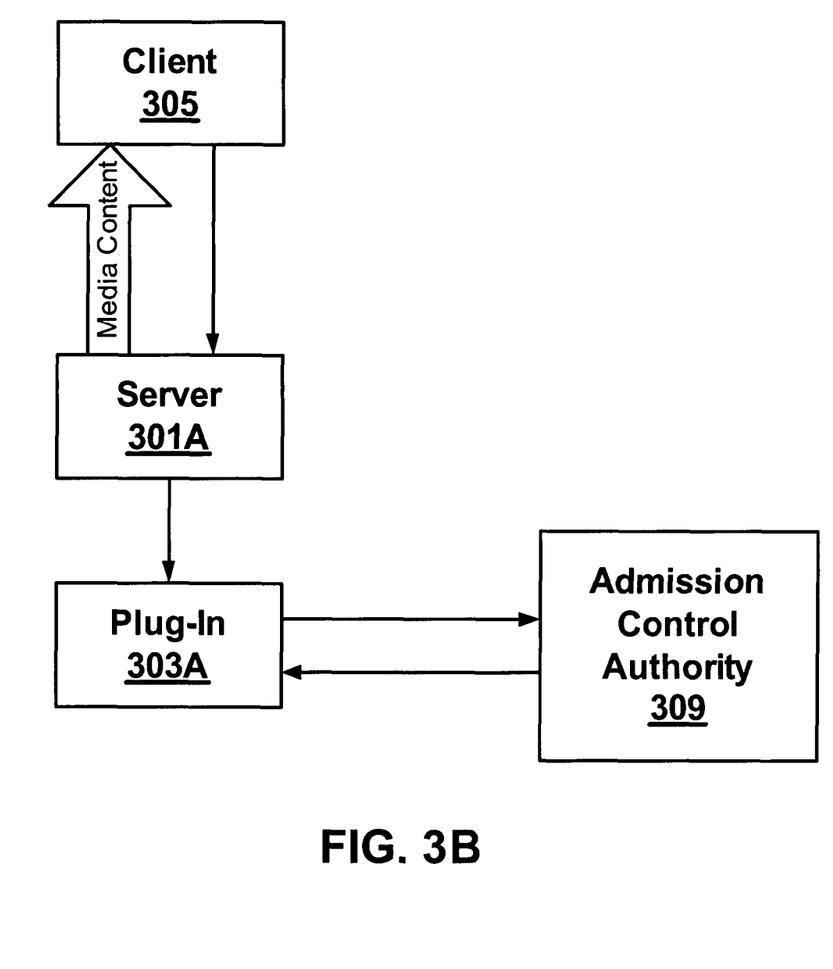
FIG. 3B shows an exemplary admission control network architecture according to one embodiment of the present invention.

FIG. 3B illustrates the operation of a control plug-in 303A according to one embodiment of the present invention. As shown in FIG. 3B, control plug-in 303A accesses details of a request for media content that is made by client 305 from server 301A and communicates the details of the request to admission control authority 309. The decision of the admission control authority 309 is subsequently accessed by the control plug-in 303A and supplied to the server 301A associated with control plug-in 303A. If the request is granted (e.g., content admission is authorized), media content is thereafter admitted from the server 301A into a network and transmitted to the requesting client 305.

It should be noted that in the FIG. 3B embodiment: (1) client 305 talks to server 301A (e.g., makes a request for media content), (2) server 301A talks to plug-in 303A (e.g., details of request accessed by plug-in 303A), (3) plug-in 303A talks to admission control authority 309 (e.g., details of request accessed by admission control authority 309), (4) admission control authority 309 talks to plug-in 303A (e.g., admission control decision accessed by plug-in 303A), (5) plug-in 303A talks to server 301A (admission control decision accessed by server 301A), and (6) the admission of the media content is either granted or denied based on decision made by admission control authority 309.

In a streaming scenario in one embodiment, several control messages are exchanged before the bulk of media content transfer (e.g., transmission of media content to a client) begins. When clients (e.g., 305) send control messages to request media content from a media content server (e.g., 301A-301C in FIG. 3A), the request is passed to a plug-in module 303A-303C (as discussed above) that communicates an admission authorization request (that includes information that is relevant to the request for media content) to the admission control authority 309.

Relevant information includes the requesting client's Internet protocol (IP) address, the uniform resource locator (URL) being requested, and the URL encoding rate. Based on this information the admission control authority 309 can determine which network link corresponds to the requests, what the current state of the link is, and can consider the request in light of the admission control policy set by the system administrator.

There are several advantages of the plug-in architectures employed in exemplary embodiments, where admission control is triggered by the control messages exchanged between a server (e.g., 301A, 301B or 301C in FIG. 3A) and client 305. In exemplary embodiments, because the admission control authority 309 consumes negligible resources until queried by a plug-in (e.g., 303A-303C) resources are efficiently utilized since admission control queries are initiated by the plug-in (e.g., 303A-303C) only on demand. Moreover, all latency associated with performing an admission control decision can be hidden, by having the plug-in 303A make its query slightly ahead of the point in time when resources begin to be consumed (e.g., served, communicated, transmitted, etc.). It should be appreciated that existing servers (e.g., streaming servers) already support plug-in implementations.

Referring again to FIG. 3A, clients 305 make requests for desired media content to servers 301A-301C. As previously discussed, several control messages can be exchanged between a client 305 and a server (e.g., 301A, 301B or 301C) before the bulk of media content transfer is begun (see discussion made with reference to FIG. 4 below). In the present embodiment, the admission control authority 309 determines whether a request for media content will be granted.

Admission control authority 309 receives media content admission authorization requests (e.g., queries) from the server plug-ins 303A-303C that are associated with servers (e.g., 301A, 301B and 301C) that are a part of the pool of servers 301A-301C. In one embodiment, the media content admission authorization requests detail the requests for media content that are received by the servers (e.g., 301A, 301B and 301C) that are a part of the pool of servers 301A-301C. As discussed above, the admission control authority 309 determines whether a request for media content will or will not be granted.

In response to a media content admission authorization request, the admission control authority 309 generates a media content admission authorization command (message, signal, etc., that communicates either a granting or a denying of authorization) that is accessible by the server (e.g., 301A, 301B or 301C) to which the request for media content is made. It should be appreciated that the admission control authority 309 coordinates the network admission of media content from each of the servers (301A, 301B and 301C) in a pool of servers with the network admission of media content from the rest of the plurality of servers in the pool of servers 301A-301C through its issuance of media content admission authorization commands.

In exemplary embodiments, admission control authority 309 serves to de-couple media content admission decisions related to the servers (301A, 301B and 301C) in the pool of servers 301A-301C from the servers' content serving functionality. Moreover, the admission control authority 309 makes content admission decisions for individual servers (301A, 301B and 301C) in the pool of servers 301A-301C based on the aggregate requests that are received by the pool of servers 301A-301C (as opposed to having each server make its own individual local admission control decision based on the requests that an individual server receives).

In the present embodiment, admission control authority 309 masks the latency that attends the media content admission authorization process by completing authorization decisions during the period when other session control exchanges between a client 305 and a server (301A, 301B or 301C) take place. More specifically, the admission control authority 309 can access a media content admission authorization request from and provide a media content admission authorization decision to a server (e.g., 301A, 301B or 301C) during the period of time encompassed by the exchange of messages between the client 305 and the server (e.g., 301A, 301B or 301C) that is preliminary to the transfer of media content. Consequently, a decision to grant or deny a request (e.g., an admission control decision to grant or deny authorization, etc.) can be made by the admission control authority 309 during a period before media content is scheduled for transference from server (e.g., 301A, 301B or 301C) to client 305.

In one embodiment, components and operations embodied by the admission control authority 309 can be separate from, but operate in cooperation with components and operations associated with one or more of the servers (301A, 301B, and 301C). In an alternate embodiment, the components and operations embodied by the admission control authority 309 can be encompassed by components and operations that are associated with one or more of the servers (e.g., 301A, 301B and 301C). In such embodiments, a designated one or more of the components of the admission control authority 309, that can be designated based on a coordination with other components of the admission control authority 309, can make the decision to either grant or deny a request for media content.

It should be appreciated that storage 307 can be employed to store information that is used in the media content admission authorization process or in other related operations or data storage applications.

In operation, when a client 305 makes a request to a server (e.g., 301A, 301B or 301C) for desired media content, the server (e.g., 301A, 301B or 301C) (via plug-in 303A, 303B or 303C) makes a request to the admission control authority 309 for authorization to initiate the transmission of the requested media content. The admission control authority 309 generates an authorization command (e.g., message, signal, etc., communicated to the server via the plug-in) that either grants or denies authorization to initiate the transmission of the requested media content during the period of time that attends the transfer of messages between the client 305 and the server (301A, 301B or 301C) that are preliminary to the transmission of the requested media content (e.g., streaming media content, etc.).

In one embodiment, the period where resources are reserved for a media content transmission session after a client (e.g., 305) pauses the transmission (e.g., streaming, etc.) of the media content can be predetermined and thus limited. For example, if it is predetermined that an allocation of resources for a media content transmission session should be limited to five minutes after a client (e.g., 305) induced pause of the session, then the resources (e.g., bandwidth, etc.) allocated to a particular stream of media content that is being provided to a client (e.g., 305) will be re-allocated five minutes after the client (e.g., 305) causes the transmission of media content to be paused. One motivation behind this design is that clients typically resume streaming shortly after pausing or they never resume at all. Further, at the end of a media stream, some clients issue a pause request instead of a terminate in anticipation of a partial replay.

Moreover, in one embodiment, the allocation of resources to a media content transmission session (e.g., streaming media content session, etc.) is terminated when a server (e.g., 301A-301C) crashes or when the session ends (or is terminated for other reasons). In one embodiment, plug-ins (303A-303C) can communicate media content terminations to admission control authority 309 in order to prompt the release of resources. In one embodiment, the admission control authority 309 periodically tests a link's bandwidth utilization to ensure that it matches the internal measure of the link's bandwidth utilization that is based on a tracking of plug-in (303A-303C) messages.

In the present embodiment a periodic signal (e.g., pulsed signal, etc.) that corresponds to a particular media content admission request and the associated media content transmission session is continually transmitted to the admission control authority 309 which maintains a record of the server (e.g., 301A-301C) that is involved in the session. If the admission control authority stops receiving the periodic signal it assumes that the server (e.g., 301A-301C) that was involved in the session has crashed. Internal book-keeping is performed to reflect the release of resources formerly allocated to the session that can be then be re-allocated elsewhere.

Figure 4:
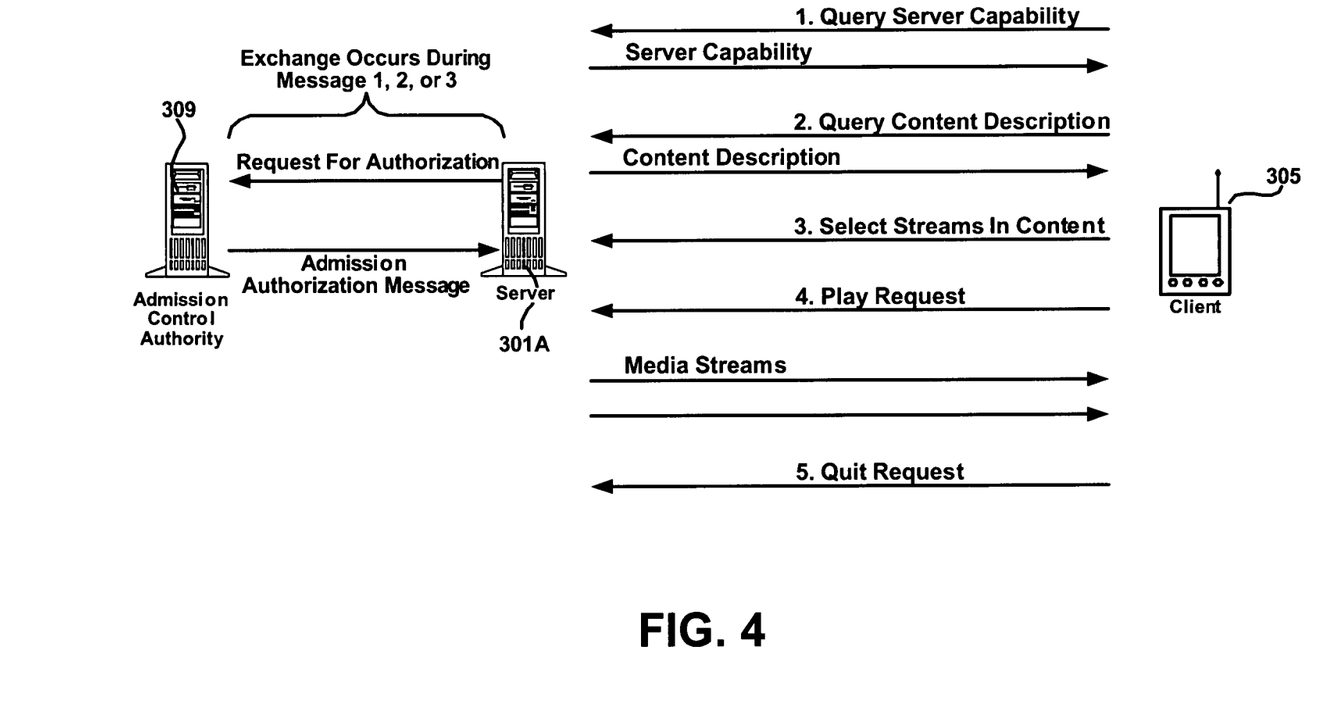
FIG. 4 is a data flow diagram of session control exchanges between a client and a server according to one embodiment of the present invention.

FIG. 4 illustrates how latency attending admission authorization decisions can be hidden behind the session control exchanges between a client and a server that are preliminary to the admission of media content into a network according to one embodiment of the present invention. FIG. 4 illustrates the session control exchanges that occur between a client and a server, such as are employed in the initiation and completion of a streaming media session according to one embodiment of the present invention.

FIG. 4 depicts the control messages (messages 1-4 in FIG. 4) that are exchanged between client 305 and server 301A before the bulk of media content transfer (e.g., transmission of media content to a client) is initiated (after message 4) according to one embodiment. The latency associated with performing an admission control decision can be hidden, by having a plug-in (e.g., 303A), or its equivalent, make its query slightly ahead of the point in time when resources begin to be transmitted (e.g., served, communicated, consumed, etc.). More specifically, as discussed previously, the admission control authority 309 can access a media content admission authorization request from and provide a media content admission authorization decision to a server 301A during the period of time encompassed by the exchange of messages between the client 305 and the server 301A that is preliminary to the transfer of media content.

It should be appreciated that a request for media content only consumes substantial bandwidth resources after message 4 when the "Play" command is issued. It is therefore possible for the server 301A to communicate with the admission control authority 309 earlier (e.g., messages 1, 2, or 3 of the exchange) and inquire as to whether the request for media content should be admitted or not (e.g., the server 301A can make a media content admission authorization request to the admission control authority 309 via a plug-in). In the present embodiment, the server 301A can still respond to all messages as if it were going to accept the request while waiting for an answer from the admission control authority 309.

The process outlined above of querying the admission control authority 309 during the exchange of messages that are preliminary to the admission of media content into a network provides ample time for the admission control authority 309 to make a decision and communicate the decision to the server 301A making the request (communicate or make accessible to server 301A, such as via a plug-in, a media content admission authorization signal, command or message from the admission control authority 309). Once the server 301A has received the decision it will honor or deny the "Play" request based on the decision that was made by the admission control authority 309. After the transfer of the desired media content is completed the session can be terminated with a "Quit Request" command (e.g., message 5 shown in FIG. 4).

Figure 5:
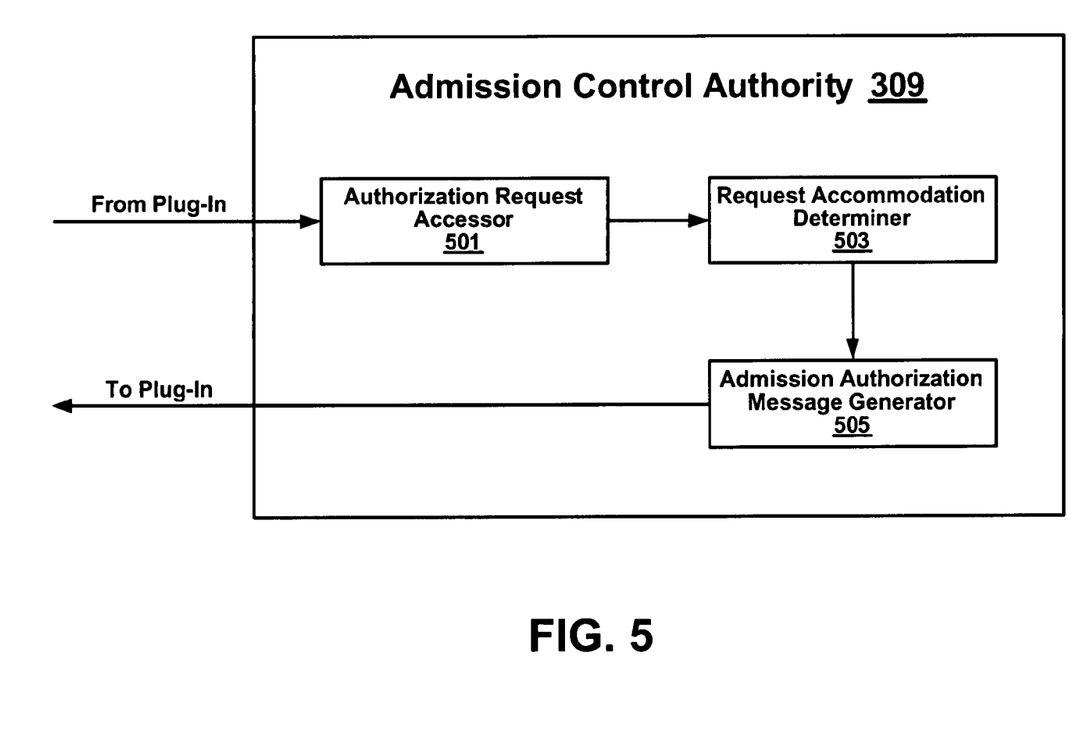
FIG. 5 shows an admission control system according to one embodiment of the present invention.

FIG. 5 shows an admission control authority 309 according to one embodiment of the present invention. In this embodiment, admission control authority 309 includes authorization request accessor 501, request accommodation determiner 503, and admission authorization message generator.

Authorization request accessor 501 accesses authorization requests from servers (such as via plug-ins, 303A-303C, in FIG. 3) that are part of a server pool (e.g., 301A-301C in FIG. 3). In one embodiment, the authorization request provide details of a request for media content made to at least one of a plurality of servers that are a part of a server pool (e.g., 301A-301C in FIG. 3), by a client (e.g., 305 in FIG. 3).

It should be appreciated the details of the authorization request can include but is not limited to accessing information selected from the group that includes a clients internet protocol (IP) address, the uniform resource locator (URL) being requested and the uniform resource locator (URL) encoding rate.

It should be appreciated that based on the details of the request an admission control unit can determine which network link corresponds to the requests, what the current state of the link is and how this request affects admission control policy set by the system administrator.

Request accommodation determiner 503 determines whether at least one of a plurality of servers (server pool 301A-301C in FIG. 3) will be authorized to accommodate a request for media content. In one embodiment the determination is based on data accessed from each of the plurality of servers (301A, 301B and 301C in FIG. 3) and from communications links of the network.

Admission authorization message generator 505 generates a media content admission authorization command that is accessible by at least one of a plurality of servers (301A, 301B or 301C in FIG. 3). In one embodiment, the media content admission authorization message coordinates the admission of media content from at least one of the plurality of servers (301A, 301B or 301C in FIG. 3) with the admission of media content from the plurality of servers (server pool 301A-301C in FIG. 3). In one embodiment the coordination is based on the aggregate requests of the plurality of servers (aggregate requests made to servers in server pool 301A-301C in FIG. 3).

Figure 6:
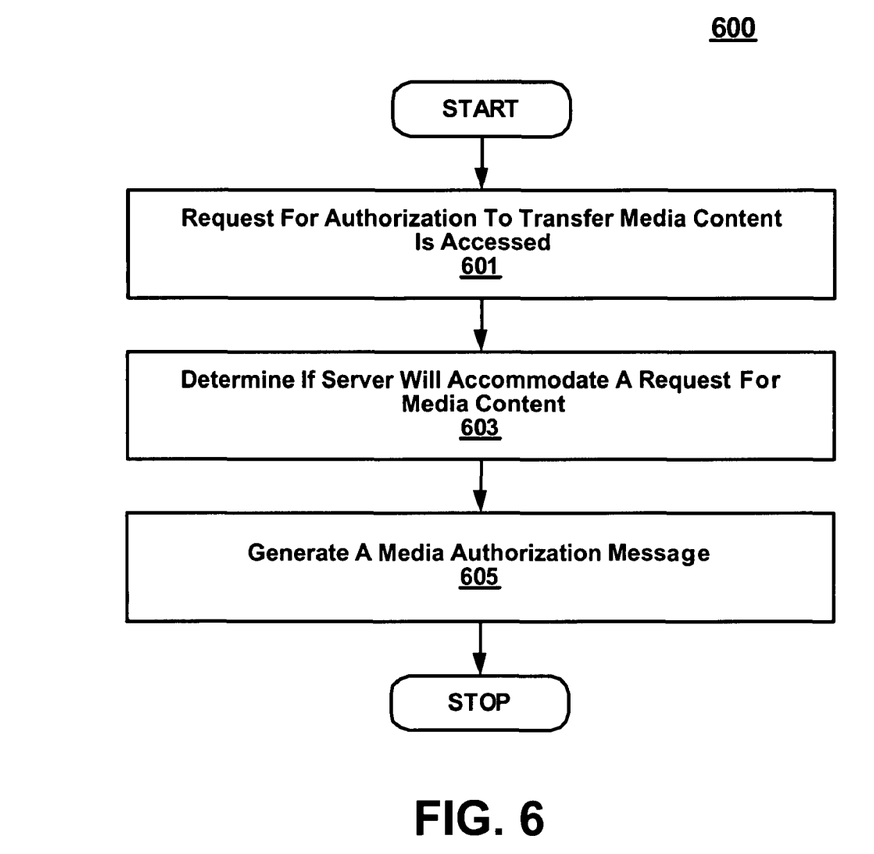
FIG. 6 shows a flowchart of a method for controlling the admission of media content into a network according to one embodiment of the present invention.

Exemplary Operations in a Method for Controlling the Admission of Media Content Into a Network According to One Embodiment of the Invention FIG. 6 shows a flowchart 600 of the steps performed in a method for controlling the admission of media content into a network according to one embodiment of the present invention.

At step 601, a request for authorization to transfer media content (e.g., streaming media content etc.) is accessed. The request for authorization to transfer media content includes details of a request for media content made to at least one server of a plurality of servers.

At step 603, it is determined whether at least one of the servers will accommodate the request for media content.

At step 605, a media content admission authorization message is generated that is accessible by at least one of the servers. According to one embodiment, the media content admission authorization message coordinates the admission of media content from at least one of the plurality of servers with the admission of media content from the plurality of servers.

Figure 7:
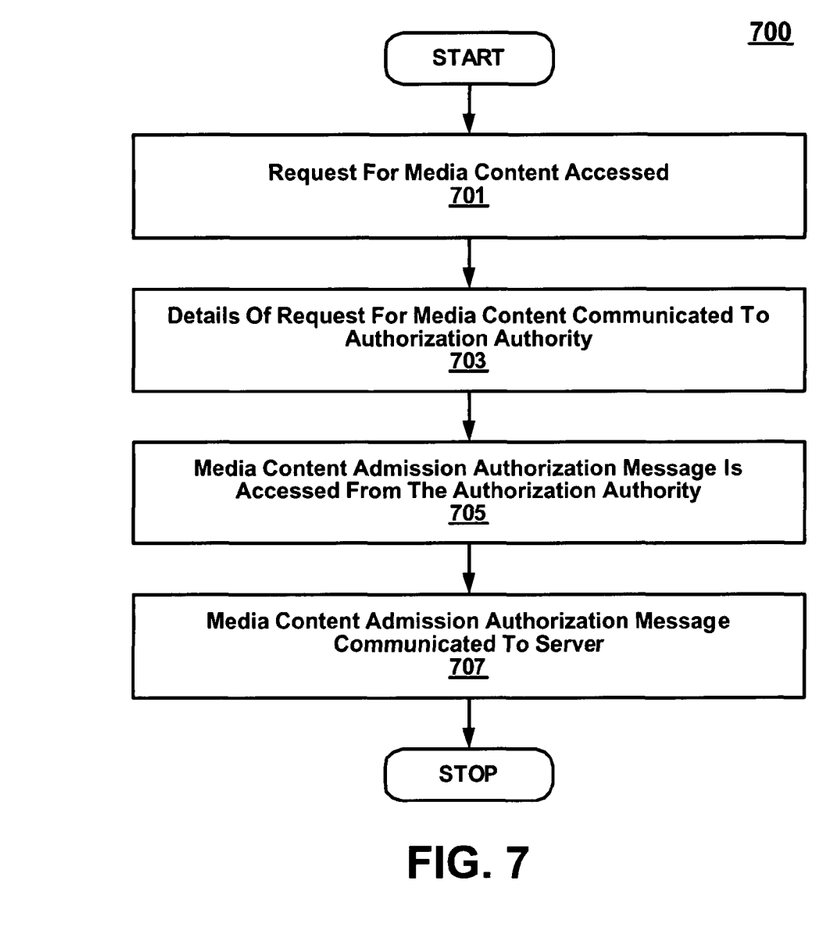
FIG. 7 shows a flowchart of a method for controlling the admission of media content into a network according to one embodiment of the present invention.

FIG. 7 shows a flowchart 700 of the steps performed by a plug-in in a method for controlling the admission of media content into a network according to one embodiment of the present invention.

At step 701, a request for media content made to an associated server that is at least one server of a plurality of servers is accessed.

At step 703, details of the request for media content are communicated to an admission control authority.

At step 705, a media content admission authorization message is accessed from the admission control authority.

At step 707, the media content admission authorization message is communicated to the associated server. The media content admission authorization command coordinates the admission of media content from the associated server with the admission of media content from the plurality of servers.

Embodiments of the present invention provide an admission control architecture that makes it possible to accommodate multiple servers, multiple network links, variable link capacity, and variable background TCP traffic. In such embodiments the admission control decision is decoupled from the media serving functionality. Instead of relying on each media server to implement its own local media admission control, exemplary embodiments provide that each server (301A-301C) communicate with an admission control authority 309 that makes decisions based on the aggregate requests of multiple servers (301A-301C). Accordingly, embodiments of the present invention remedy the problems of conventional systems (e.g., over and under usage of links) by providing a common admission control authority 309 that coordinates the media content admissions of a pool of servers (301A-301C).

Embodiments of the present invention allow the establishment of admission control policies that are suitable to different settings, since there can be substantial variance concerning what constitutes suitable admission control policies from one corporate environment to another. In one embodiment, admission control policies can include but are not limited to allocating a fraction of the link to streaming traffic, allocating a fixed amount to TCP traffic and the remainder to user datagram protocol (UDP), or targeting a particular packet loss rate, etc.

In one embodiment, the release of resources is flagged in order to ensure a timely accounting of their release. The admission control unit periodically tests a link's bandwidth utilization to ensure that it matches a tracking system (e.g., that tracks plug-in messages) that is internal to the plug-in (e.g., 303A-303C) since a stream can terminate without the plug-in (e.g., 303A-303C) being aware of its termination.

Some conventional approaches to admission control involve the mere setting of a server threshold. Such approaches have disadvantages where multiple servers (e.g., 301A-301C) may be cooperating to service multiple network links (which is a common scenario). Other admission control policies focus on managing the network itself rather than the servers (e.g., 301A-301C) generating the traffic into the network.

Embodiments of the present invention operate more efficiently than any of the schemes that try to manage the network directly. More specifically, in these embodiments, a decision is made whether or not particular media content should be admitted into the network, rather than prioritizing particular media content inside a network switch. Moreover, since this can be done outside the server (e.g., 301A-301C) itself, exemplary embodiments have the capacity to monitor multiple network links and decide how the aggregate set of requests across all servers (e.g., 301A-301C) will affect each link before making a decision.

Embodiments of the present invention solve the problems presented by the concurrent use of network links by both streaming and non-streaming traffic flows. Additionally, embodiments of the present embodiment ensure that the network administrator has the capability to set a level of bandwidth availability for regular corporate network traffic, while at the same time maintaining a high level of quality for all streaming requests that are accepted by the system.

It should be appreciated that embodiments of the present invention do not rely upon reservations. In one embodiment, requests are accepted until a target utilization has been reached. By contrast, systems that employ reservations accept all requests from a particular traffic class and then try to manage their traffic flows to ensure that bandwidth utilization within each class remains below the threshold set by the administrator.

In summary, existing approaches either accept all traffic flows and attempt to prioritize them inside the network (allowing the network administrator to set target utilizations and target priorities) or to manage the admission of traffic flows on a per server basis. Network centered approaches can ensure that TCP flows are accommodated but require global network infrastructure upgrades that are both costly and difficult to manage. Server centered approaches as discussed earlier can fail to account usage properly in the presence of multiple network links and multiple streaming servers. Embodiments of the present invention offer an efficient solution and can be integrated with existing network infrastructures and streaming servers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling the admission of media content into a network, comprising:

accessing a request for authorization to transfer media content, wherein said request for authorization comprises details of a request for media content made to a server of a plurality of servers, wherein based on said details of said request for authorization to transfer media content an admission control authority can determine which communication link corresponds to said request for media content, can determine what a current state of said communication link is, and can determine how an admission control policy of said network will affect said request for media content;

determining whether said server will be authorized to accommodate said request for media content, said determining based at least in part on data accessed from said plurality of servers and on data accessed from a plurality of communications links of said network; and generating a message that is accessible by said server, said message comprising information as to whether said server is authorized to initiate a transmission of said media content, wherein an admission of media content from said server is coordinated with admissions of media content from said plurality servers and based on an aggregation of requests of said plurality of servers wherein said servers are augmented with server side extensions that are responsible for communicating with an admission control authority and for relaying decisions of said admission control authority back to said servers and wherein said admission control authority periodically tests a link's bandwidth utilization to ensure that it matches said admission control authority's internal measure of bandwidth utilization that is based on tracking plug-in messages.

2. The method of claim 1 wherein said message is made before a "Play" command is issued, from a client, to said server, that prompts admission of said media content.

3. The method of claim 1 wherein said message is made during communications between said server and a client that precede the issuance of a command from said client to said server to initiate admission of said media content.

4. The method of claim 1 wherein said server side extensions communicate media content terminations to an admission control unit to prompt the release of resources.

5. The method of claim 1 wherein said accessing include accessing information selected from the group consisting of a client's internet protocol (IP) address, a uniform resource locator (URL) being requested and an encoding rate.

6. The method of claim 1 wherein said media content comprises streaming media content.

7. The method of claim 1 wherein said admission control authority is comprised of a plurality of components that operate cooperatively and either reside at the same or different locations.

8. The method of claim 1 wherein said server side extensions comprise plug-ins.

9. A system for controlling the admission of media content into a network, comprising:
   an authorization request accessor for accessing a request for authorization to transfer media content, wherein said request for authorization comprises details of a request for media content made to a server of a plurality of servers, wherein based on said details of said request for authorization to transfer media content an admission control authority can determine which communication link corresponds to said request for media content, can determine what a current state of said communication link is, and can determine how an admission control policy of said network will affect said request for media content;
   a request accommodation determiner for determining whether said server will be authorized to accommodate said request for media content, said determining based at least in part on data accessed from said plurality of servers and on data accessed from a plurality of communications links of said network; and
   an admission authorization message generator for generating a message that is accessible by said server, said message comprising information as to whether said server is authorized to initiate a transmission of said media content, wherein an admission of media content from said server is coordinated with admissions of media content from said plurality of servers and based on an aggregation of requests of said plurality of servers wherein said servers are augmented with server side extensions that are responsible for communicating with an admission control authority and for relaying decisions of said admission control authority back to said servers and wherein said admission control authority periodically tests the bandwidth utilization of a network link to ensure that it matches an internal admission control authority measure of bandwidth utilization that is based on tracking plug-in messages.

10. The system of claim 9 wherein said admission authorization message generator generates an admission authorization message that is made before the issuance of a "Play" command, from a client, to said server that prompts admission of said media content.

11. The system of claim 9 wherein said admission authorization message generator generates a message that is made during communications between said server and a client and that precedes the issuance of a command from said client to said server to initiate admission of said media content.

12. The system of claim 9 wherein said server side extensions communicate stream terminations to an admission control unit to prompt the release of resources.

13. The system of claim 9 wherein said authorization request accessor accesses details of said request that includes accessing information selected from the group consisting of a client's internet protocol (IP) address, a uniform resource locator (URL) being requested and an encoding rate.

14. The system of claim 9 wherein said admission control authority periodically tests the bandwidth utilization of a network link to ensure that it matches an internal admission control authority measure of bandwidth utilization that is based on tracking plug-in messages.

15. The system of claim 9 wherein said media content comprises streaming media content.

16. The system of claim 9 wherein said admission control authority is comprised of a plurality of components that operate cooperatively and reside either at the same or different locations.

17. The system of claim 9 wherein said server side extensions comprise plug-ins.

18. A non-transitory computer useable medium having computer useable code embodied therein causing a computer to perform operations comprising:
   receiving a request for authorization to transfer media content, wherein said request for authorization comprises details of a request for media content made to a server of a plurality of servers, wherein based on said details of said request for authorization to transfer media content an admission control authority can determine which communication link corresponds to said request for media content, can determine what a current state of said communication link is, and can determine how an admission control policy of said network will affect said request for media content;
   deciding whether said server will be authorized to accommodate said request for media content, said deciding based at least in part on data accessed from said plurality of servers and on data accessed from a plurality of communications links of said network;
   issuing a message that is accessible by said server, said message comprising information as to whether said server is authorized to initiate a transmission of said media content, wherein an admission of media content from said server is coordinated with admissions of media content from said plurality of servers and based on an aggregation of requests of said plurality of servers; and
   wherein said servers are augmented with server side extensions that are responsible for communicating with an admission control authority and for relaying decisions of said admission control authority back to said servers and wherein said admission control authority periodically tests the bandwidth utilization of a network link to ensure that it matches an internal admission control authority measure of bandwidth utilization that is based on tracking plug-in messages.

19. The non-transitory medium of claim 18 wherein said message is made before a command is issued, from a client, to said server to prompt admission of said media content.

20. The non-transitory medium of claim 18 wherein said message is made during communications between said server and a client that precede the issuance of a command from said client to said server to initiate admission of said media content.

21. The non-transitory medium of claim 18 wherein said server side extensions communicate stream terminations to an admission control unit to prompt the release of resources.

22. The non-transitory medium of claim 18 wherein said receiving includes accessing information selected from the group consisting of a client's internet protocol (IP) address, a uniform resource locator (URL) being requested and an encoding rate.

23. The non-transitory medium of claim 18 wherein said media content comprises streaming media content.

24. The non-transitory medium of claim 18 wherein said admission control authority is comprised of a plurality of components that operate cooperatively and either reside at the same or different locations.

25. The non-transitory medium of claim 18 wherein said server side extensions comprise plug-ins.

26. A method for controlling the admission of media content into a network, comprising:

accessing a request for media content made to an associated server that is one of a plurality of servers;

communicating details of said request for media content to an admission control authority, wherein based on said details of said request for authorization to transfer media content an admission control authority can determine which communication link corresponds to said request for media content, can determine what a current state of said communication link is, and can determine how an admission control policy of said network will affect said request for media content;

accessing a media content admission authorization command from said admission control authority, wherein said media content admission authorization command is determined based at least in part on data accessed from said plurality of servers and on data accessed from a plurality of communications links of said network; and communicating said media content admission authorization message to said associated server, said message comprising information as to whether said server is authorized to initiate a transmission of said media content, wherein an admission of media content into a network from said associated server is coordinated with admissions of media content into a network from said plurality of servers and based on an aggregation of requests of said plurality of servers wherein said servers are augmented with server side extensions that are responsible for communicating with an admission control authority and for relaying decisions of said admission control authority back to said servers and wherein said admission control authority periodically tests the bandwidth utilization of a network link to ensure that it matches an internal admission control authority measure of bandwidth utilization that is based on tracking plug-in messages.

27. The method of claim 26 wherein said media content comprises streaming media content.

* * * * *